US007494803B1

(12) United States Patent
Smith

(10) Patent No.: US 7,494,803 B1
(45) Date of Patent: Feb. 24, 2009

(54) BIO-COMPOSTING DOMESTIC WASTE TREATMENT APPARATUS

(76) Inventor: Danny R. Smith, 2252 N. Poca River Rd., Poca, WV (US) 25159

( * ) Notice: Subject to any disclaimer, the term of this patent is extended or adjusted under 35 U.S.C. 154(b) by 678 days.

(21) Appl. No.: 11/111,298

(22) Filed: Apr. 21, 2005

(51) Int. Cl.
*C12M 1/00* (2006.01)
(52) U.S. Cl. .................. 435/290.1; 435/290.4; 422/272; 210/155; 210/172.1; 210/261; 210/306; 210/320
(58) Field of Classification Search .............. 435/290.1, 435/290.4; 210/172.1, 613, 615, 306, 320, 210/155, 261; 422/272; 4/DIG. 12
See application file for complete search history.

(56) References Cited

U.S. PATENT DOCUMENTS

| | | | | |
|---|---|---|---|---|
| 2,279,813 | A | * | 4/1942 | Bent ........................... 210/320 |
| 3,840,907 | A | | 10/1974 | Sundberg |
| 3,916,456 | A | | 11/1975 | Persson |
| 4,096,592 | A | | 6/1978 | Clark |
| 4,313,234 | A | | 2/1982 | Stewart |
| 4,319,998 | A | * | 3/1982 | Anderson ..................... 210/86 |
| 4,608,175 | A | * | 8/1986 | Nuttle ....................... 210/532.2 |
| 4,687,645 | A | | 8/1987 | Harvey |
| 4,797,367 | A | | 1/1989 | Pinder |
| 4,894,872 | A | | 1/1990 | Anderson, Jr. et al. |
| 5,031,796 | A | | 7/1991 | Schafer et al. |
| 5,171,690 | A | | 12/1992 | Ylosjoki |
| 5,207,899 | A | * | 5/1993 | Boyle ........................ 210/138 |
| 5,345,620 | A | | 9/1994 | Sundberg |
| 5,501,978 | A | | 3/1996 | Sundberg |
| 5,545,559 | A | | 8/1996 | Kariniemi |
| 5,575,913 | A | * | 11/1996 | Sharkey ...................... 210/409 |
| 5,874,647 | A | * | 2/1999 | McGhee et al. ............. 568/800 |
| 5,948,674 | A | | 9/1999 | Mankiewicz |
| 6,260,216 | B1 | | 7/2001 | Lejgren |

(Continued)

*Primary Examiner*—William H Beisner
*Assistant Examiner*—Michael Hobbs
(74) *Attorney, Agent, or Firm*—Waters Law Group, PLLC; Robert R. Waters; Olen L. York, III

(57) ABSTRACT

An apparatus for bio-composting domestic waste from residential dwellings, comprised of a tank, a multi-chambered liner and a separator. Domestic waste influent enters one end of a sluice, which has ribs on its surface directing the influent onto the upper section of an inclined sieve. The inclined sieve is angled downward and is permeable. The influent waste flows down the inclined sieve, and free water drops downward through the sieve while separated waste solids slide off the lower edge of the inclined sieve. The multi-chambered liner is set inside the tank under its lid. The multi-chambered liner is partitioned into a first chamber running the length of the liner on one half its wide, which the other half its width is subdivided into a series of smaller sub-chambers running the length of the liner. The chambers are separated by permeable partitions. The walls of the liner are permeable, as well. Water separated from the influent through the sieve falls into the first several of the smaller sub-chambers, while the dewatered solids discharge off the bottom edge of the inclined sieve into the first chamber. The separated waste solids are bio-composed in the first chamber, preferably by the larvae of fungus gnats, while the separated free water passes through the partitions between the series of smaller sub-chambers, removing any remaining entrained solid matter. The free water passes through the permeable walls of the multi-chambered liner and out an outlet port in the tank wall.

22 Claims, 6 Drawing Sheets

U.S. PATENT DOCUMENTS 6,379,546 B1 * 4/2002 Braun .................. 210/607
6,518,057 B2    2/2003 Morrison
2004/0226869 A1 * 11/2004 McClure et al. ............ 210/163
2005/0274669 A1 * 12/2005 Marchesseault et al. ..... 210/605

* cited by examiner

BIO-COMPOSTING DOMESTIC WASTE TREATMENT APPARATUS

BACKGROUND OF THE INVENTION

1. Field of the Invention

The invention herein relates to an apparatus for treating domestic waste and sewage produced in residential dwellings.

2. Description of the Prior Art

A typical residential dwelling contains plumbing systems for providing water service and removal of domestic and other aqueous waste. In more urban areas, the waste system connects with a sewer main located outside the dwelling, usually under the fronting public road, which directs the discharged domestic waste to a centralized municipal waste treatment plant. In rural areas, however, a sewer main may not be conveniently available and a waste system usually must be provided on-site for treating and disposing of domestic waste.

Domestic waste produced from residential dwellings typically is comprised of a mixture of waste solids and water in varying proportions. In on-site systems, the disposal system water is separated from organics solids, which may include human, kitchen, laundry and other wastes, and is discharged to the local environment. The separated solids are treated and decomposed within the on-site system to varying extents and any residual remaining thereafter must be hauled elsewhere for ultimate disposal, such as at a municipal land fill or municipal waste treatment plant.

A variety of devices and apparatus are available for collecting and treating on-site domestic waste and sewage emanating from a residential dwelling. The most common of these decentralized treatment systems are septic treatment systems. These typically involve a septic tank which receives the domestic waste water influent from the residential building. The waste is held quiescently in the tank, permitting most of the solids to settle in the bottom of the tank. The partially clarified water may then be discharged onto the surrounding property. However, the water effluent still contains some dissolved and entrained solids, and is not sufficiently safe to discharge to surface waters. Typically, the water effluent is discharged to a leach field, where the water effluent is routed to a field of buried permeable pipes. The water effluent permeates through the walls of the pipes and into the surrounding subsoil. Any waste remaining in the water effluent is entrained in the surrounding subsoil and gradually decomposed by indigenous soil organisms. The water effluent percolates downward, eventually joining the local ground water table.

This means of discharge significantly constrains septic systems. Leach fields can be practically implemented only where the soil is sufficiently permeable to permit the water effluent to percolate through it. Shallow soils, i.e., thin soil layers with bedrock close to the surface, or soils with high clay contents often are not sufficiently permeable and are unsuitable for a septic tank system.

Within the septic tank, the waste solids gradually accumulate at the bottom. Anaerobic bacteria, naturally present in the waste, begin to decompose the waste solids. However, anaerobic bacteria are comparatively inefficient and can decompose only a small fraction of the waste solids. This results in a gradual accumulation of partially-treated solids within the bottom of the septic tank. These solids are still potentially pathogenetic and usually must be hauled to a municipal waste treatment plant for further treatment and ultimate disposal before the working volume of the septic tank has filled with solids.

Another on-site decentralized domestic waste treatment system is an aerobic, activated sludge process. The process is typically comprised of an apparatus with two chambers. The first chamber contains a mixed aqueous slurry of active aerobic bacteria, called activated sludge. Aerobic conditions are maintained in the activated sludge by injecting air by one of several means known in the art. The domestic waste influent is added into and mixed with activated sludge. Aerobic bacteria absorb and decompose the entrained and dissolved solids in the domestic waste.

A small purge stream exits from the first chamber into a second chamber with quiescent conditions. The sludge mass in the slurry settles to the bottom of the second chamber, while the separated water exits from it. Activated sludge solids settle faster than the raw solids in domestic waste, so the aqueous effluent from an aerobic treatment apparatus is usually clarified sufficiently to discharge directly to a surface water body. The settled sludge is also non-pathogenic and can be more easily discarded, such as by land-farming.

The aerobic process is more efficient than the anaerobic process, but has a higher initial cost because of the need for powered machinery to operate the aeration process, as well as a higher operating cost for the electrical power needed for the aeration machinery as well as maintenance costs for the machinery.

Another class of apparatus for treating domestic waste is composting toilets and waste composting units. These units treat domestic wastes by composting, which is a method of decaying organic solids with aerobic bacteria in a solid mass or pile, with little free excess water, rather than in a slurry or fluid system. In a composting system, the waste pile, being substantially devoid of excess free water, has many miniscule voids or pores through which air can circulate, bringing oxygen to the aerobic organisms in the central volumes of the waste pile. The aerobic organisms in the waste pile digest and metabolize the waste, reducing its volume and producing more environmentally compatible humus as a final waste product, which can be more easily disposed of.

For example, Ylösjoki, U.S. Pat. No. 5,171,690, is drawn to a composting device for kitchen and toilet waste, comprised of a multi-chambered bin having a permeable floor, and air space under the floor, and a vent stack in the top surface of the bin. Wastes are deposited into one of the chambers in the bin, and air circulates up through the waste pile and out the vent stack. Any excess free water in the waste pile can drain through the permeable floor.

Similarly, Sundberg, U.S. Pat. No. 3,840,907 and Clark, U.S. Pat. No. 4,096,592, are drawn to composting toilets with permeable floors and vent stacks, allowing vertical circulation of air for promoting the growth of aerobic bacteria.

These and similar composting systems provide an efficient and lower cost alternative to septic tank and activated sludge plants, but have several disadvantages.

In each case, only solid (moist) waste can be accepted in these composting toilets. A slurry discharge, such as from traditional toilets and water closets, would wash waste solids through the permeable floor and would render the remaining saturated wastes septic. This limitation thus necessitates the composting unit to be located in or directly adjacent to the residential dwelling separated from the traditional drain plumbing. Many people find a composting unit containing decaying human waste within or immediately adjacent to the household very objectionable offensive.

A composting unit would also not be suitable for other wastes that are discharged in a slurry, such as from kitchen sink drains, dishwasher and laundry washing machines. This would then necessary alterations in a dwelling's draining plumbing system, necessitating dual discharge systems.

SUMMARY OF THE INVENTION

To alleviate the limitations of the prior art, disclosed herein is a bio-composting domestic waste treatment apparatus incorporating means for classifying domestic waste produced from traditional toilets and other waste sources found in residential dwellings into waste water and waste solids fractions, and for then bio-composting the classified waste solids fraction, thereby substantially reducing the volume of remaining solids for outside disposal, and the pathogenicity of the waste.

Domestic and kitchen waste produced from residential dwellings may be disposed of by bio-composting, which uses microfauna and microflora to digest the waste. These include many species of bacteria, protozoa and arthropodea.

When the waste solids are sufficiently well-drained and supplied with sufficient oxygen, naturally occurring flora and fauna can digest and eliminate a substantial volume of the waste. In composting systems commonly available in the art, aerobic bacteria and protozoa are the principle flora and fauna relied upon for bio-decomposition. However, other, lesser known fauna are available for decomposition which performs as well or better than protozoa and bacteria. One set of examples are member species of the families Mycetophilidae and Sciaridae, commonly known as fungus gnats. These flies are very small, the adult usually being in the range of $\frac{1}{16}^{th}$ to $\frac{1}{8}^{th}$ inch long. The lifecycle of the fungus gnat is typical of other flies, comprising an egg, larval, pupae and adult stages. The adult fly lays eggs on decaying organic matter, which hatch into small white maggots, or larvae. The larvae ingest and consume any proximate organic waste until they enter a pupa. They emerge from the pupae as a flying adult, living only a short period during which they lay the next generation of eggs. Fungus gnats are not strong fliers, and will generally remain within one locale if sufficient food sources are present.

The fungus gnat is generally considered a pest, and will quickly infest and consume sources of organic matter, such as potting soil in potted plants. However, their lifecycles and feeding preferences are well suited for composting domestic waste, so long as a satisfactory environment is presented for their continued habitation. This includes an organic food source which is moist or damp, but not excessively wet or soggy which leads to anoxic and septic conditions in the waste pile.

To foster a suitable environment for bio-compositing of domestic waste, especially one suitable for the fungus gnat larvae, a bio-composting domestic waste treatment apparatus is comprised of a tank, a multi-chambered permeable liner within the tank, and a separator on top of the tank. The separator receives waste produced from a typical residential dwelling, which typically has a high fraction of water used to flush waste through the drain piping from a toilet or kitchen sink. The excess water in the waste must be removed to create a suitable environment for the preferred bio-compositing organisms. The separator is comprised of a sluice and an inclined sieve. The sluice directs waste influent received from a waste pipeline from a domestic residence onto the inclined sieve. The sluice is concave, and has a number of ribs along its surface. The ribs are angled to the longitudinal axis of the sluice to direct incoming waste to the top of the inclined sieve and slow the velocity of the waste flow. These actions promote better distribution of the waste across the face of the sieve and increase residence time of the waste on the sieve, both of which improve the separation efficiency between the solids and waste water.

The inclined sieve is disposed at the end of the sluice, and is sloped orthogonal to the sluice. The sieve is generally a flat plate or sheet with a plurality of openings or holes. Waste water and smaller solid particles drop through the holes, and the dewatered solids slide off the lowest edge of the inclined sieve.

The classified waste water and solids each fall into separate sub-chambers within the multi-chambered liner within the tank. The multi-chambered liner has a floor, permeable walls and open top. The multi-chambered liner is divided longitudinally in half into one long first chamber on one side and a series of small sub-chambers on the other side. The smaller chambers are arranged serially along the longitudinal length of the second side. The partitions between the various chambers are permeable, as well.

The dewatered solid waste falling from the inclined sieve are directed into the first chamber and the waste water descending through the inclined sieve into the first several smaller sub-chambers on the second side. The waste water proceeds through the partitions between the series of smaller sub-chambers, which retain smaller solid particles not removed by the inclined sieve.

After traversing through the series of smaller sub-chambers, the waste water permeates through the wall of the liner into the interstitial volume between the walls of the liner and the tank. An outlet is located at or near the bottom of the wall of the tank opposite that of the inlet.

One objective of the current invention is to provide an apparatus for composting domestic and kitchen waste streams from residential dwellings.

Another objective of the current invention is to provide an apparatus that sufficiently treats domestic waste to result in a water effluent that is safe to discharge to the environment.

Another objective of the current invention is to provide an apparatus that sufficiently treats domestic waste to eliminate a substantial amount of accumulation of solid waste requiring outside disposal.

Another objective of the current invention is to provide a composting apparatus that is capable of accepting domestic waste streams as typically generated from a residential dwelling.

Another objective of the current invention is to provide a composting apparatus that may be located at a distance from the residential dwelling.

These and other objectives and advantages of the invention will become apparent from the description which follows. In the description, reference is made to the accompanying drawings, which from a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

As used herein, the term "outboard" refers to a horizontal direction towards the sidewalls 10 and away from the center longitudinal axis of the bio-composting domestic waste treatment apparatus.

The term "inboard" refers to a horizontal direction towards the center longitudinal axis and away from the sidewalls of the bio-composting domestic waste treatment apparatus.

Figure 1:
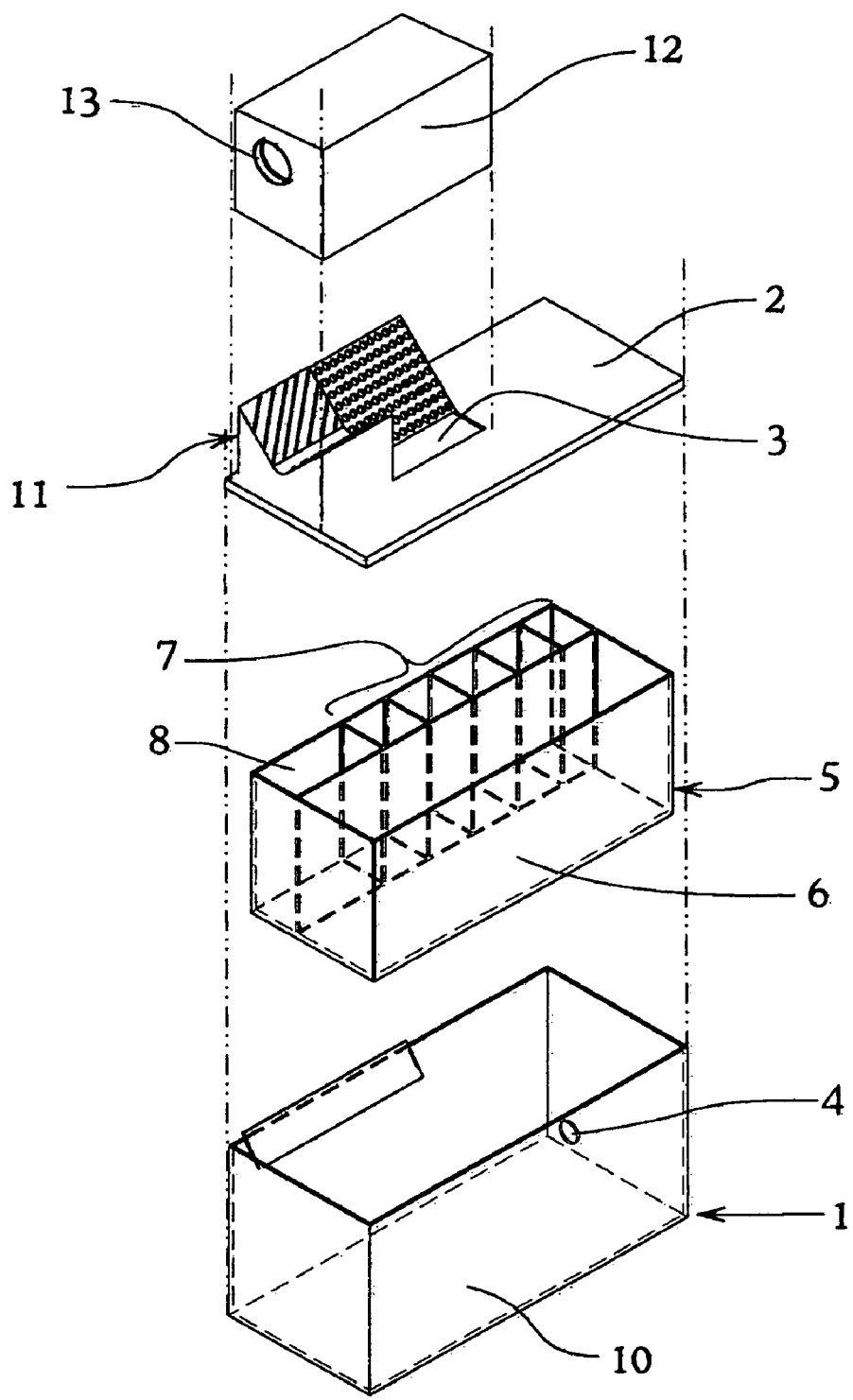
FIG. 1 is and exploded perspective drawing of the preferred embodiment of the bio-composting waste treatment apparatus, showing assembly of the major components.

As shown in FIG. 1, a bio-composting domestic waste treatment apparatus is comprised of a tank 1, a multi-chambered liner 5 and a separator assembly 11. The tank 1 is preferably a rectangular box with a solid floor, vertical sidewalls 10 and a removable lid 2 disposed on the top edges of the sidewalls 10. A rectangular opening 3 in the lid 2 is disposed proximate to one end and offset laterally from the longitudinal centerline of the lid 2. An outlet 4 is disposed near the bottom of the sidewall 10 at the end opposite that of the rectangular opening in the lid 2. The tank 1 may be constructed from one of many suitable structural materials, including fiberglass, plastic resin, corrosion-resistant metals, or coated metals.

Figure 2:
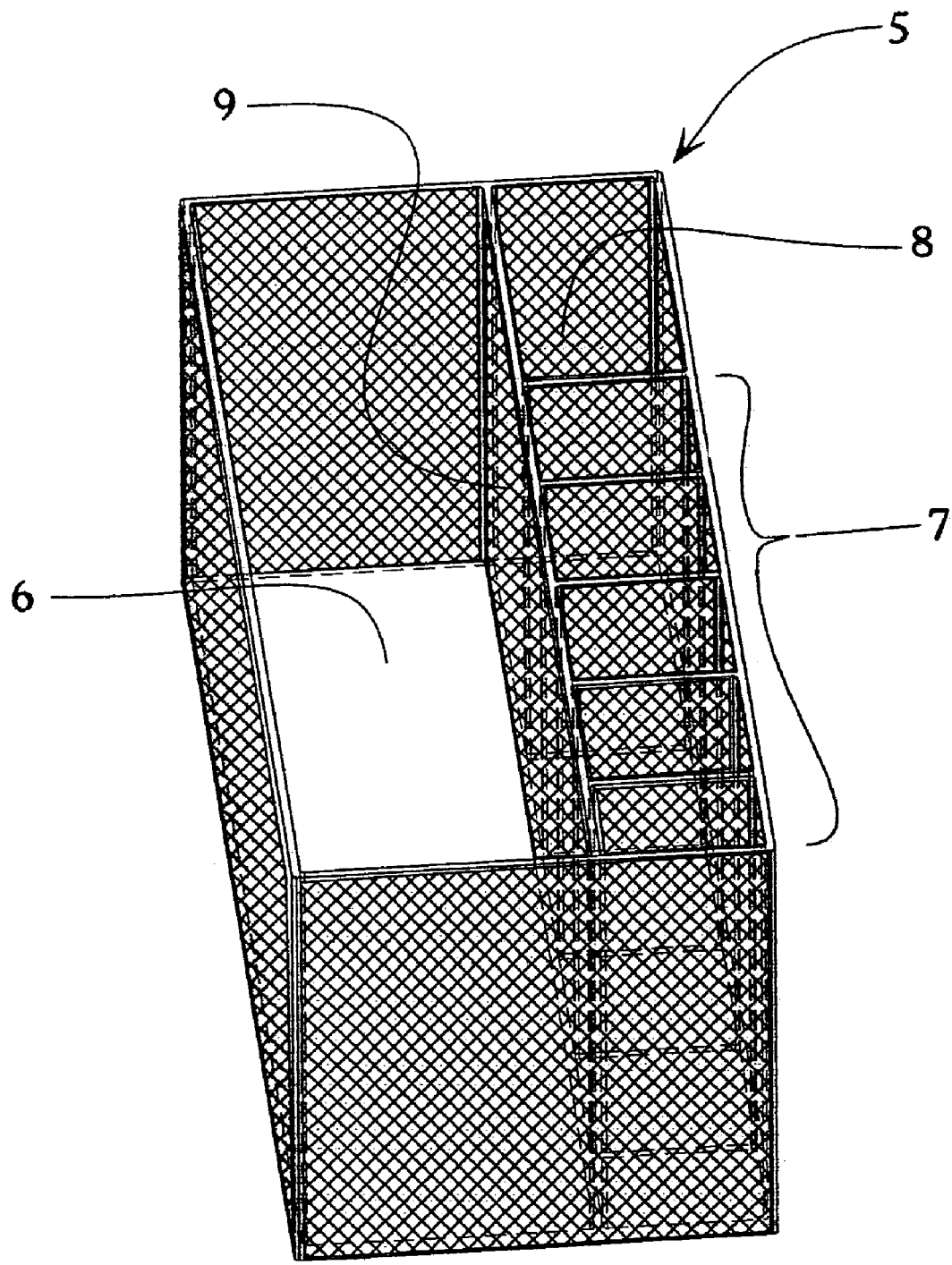
FIG. 2 is a perspective drawing of the apparatus, with the tank and separator cover removed.

Disposed within the tank 1 is a multi-chambered liner 5. The multi-chambered liner's 5 dimensions in length and width are slightly less than those of the interior of the tank 1, creating a small interstitial void between the sides of multi-chambered liner 5 and the interior of the sidewalls 10 of the tank 1. As shown in FIG. 2, the multi-chambered liner 5 has a floor and permeable walls. The multi-chambered liner 5 is divided medially along its length by a vertical partition 9 into a first chamber 6 on one side, traversing the length of the multi-chambered liner 5, and by additional vertical partitions 9 into a series of sub-chambers along the length of the multi-chambered liner 5 on the other side. The sub-chambers second side comprises a larger first sub-chamber 8 and a series of small sub-chambers 7.

The multi-chambered liner 5 is illustrated in FIG. 2. In the preferred embodiment, the floor of the multi-chambered liner 5 is solid, while it is permeable in an alternate embodiment.

The walls of the multi-chambered liner 5 are permeable as well, constructed in a manner similar to the partitions 9, and having effective openings of approximately $3/8^{th}$ inch.

The partitions 9 between the several chambers are all permeable. They are preferably constructed of a flat sheet stock, made of HDPE, polypropylene or other suitably rigid plastic, having cut or stamped therein a matrix of circular openings. A partition 9 between the first sub-chamber 6 and the first series of smaller sub-chambers 7 has effective openings of approximately $5/8^{th}$ inch. The partition 9 between the first two smaller sub-chambers 7 has $5/8^{th}$ inch openings as well. The partitions 9 between the remaining smaller sub-chambers 7 have effective openings of approximately $3/8^{th}$ inch.

Returning to FIG. 1, a removal lid 2 sits on top of the tank 1, enclosing the multi-chambered liner 5 therein. The rectangular opening 3 in the lid 2 is disposed in the lid 2 proximate to an end opposite the end adjacent to the outlet 4 and offset laterally to one side from the longitudinal centerline of the lid 2. The separator assembly 11 sits above the rectangular opening 3 and is enclosed by the separator housing 12. The width of the separator housing 12, and the rectangular opening 3, is slightly more than half the width of the multi-chambered liner 5 and as long as the first three of the sub-chambers 7. The separator housing 12 has an inlet 13 at the end adjacent to the end of the tank 1. A hinged lid comprises its top surface, which is slightly sloped (1:10) downward towards the outboard side of the separator housing 12. The walls and lid of the separator housing 12 are fabricated of a clear or translucent material, preferably HDPE or a polyacrylic resin. This is needed to allow entry of some light into the first chamber 6, which was found necessary for the well-being of the fungus gnats.

The separator housing 12 preferably has means for removably attaching it to the lid 2 of the tank 1, such as a flange along the bottom perimeter of the walls of the separator housing 12, through which screws may be fastened into the lid 2 of the tank 1.

Figure 3:
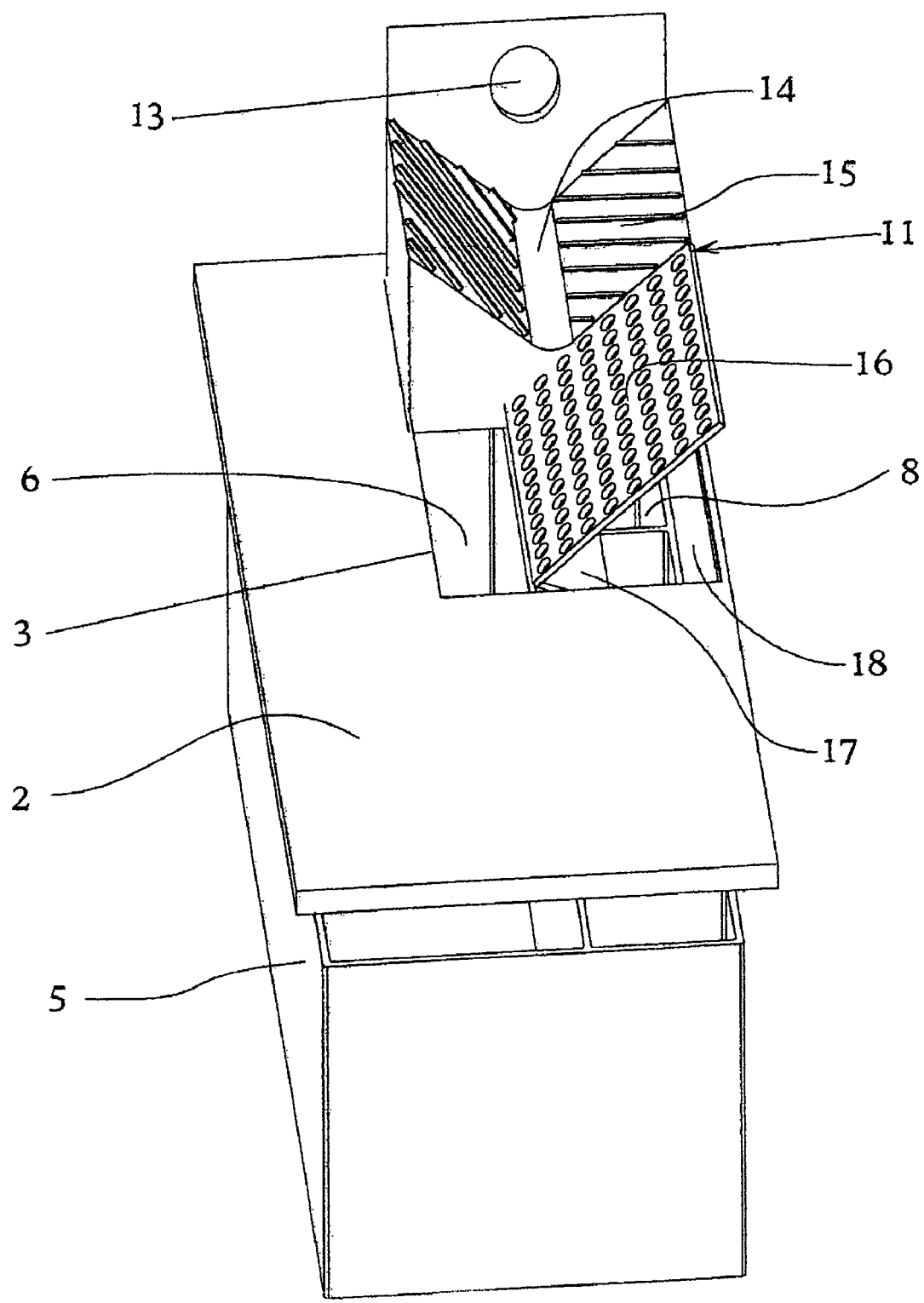
FIG. 3 is a perspective drawing of the separator assembly.

The separator assembly 11 is situated with the separator housing 12 and is comprised of a sluice 14, an inclined sieve 16 and a first slide 17 with the end wall of the separator housing 12 only shown in FIG. 3. The sluice 14 is disposed inside the separator housing 12 located adjacent to and below the inlet 13. As shown more particularly in FIGS. 3 and 4, the sluice 14 has a concave upper surface, the median of which is aligned with the center of the inlet 13 traverse approximately $1/3$rd the length of the separator assembly 11. A series of ribs 15 protrude upward from the upper surface of the sluice 14 which are angled toward the outboard side of the separator housing 12, preferably at an angle of 45 degrees to the longitudinal axis of the sluice 14.

An inclined sieve 16 is disposed at the end of the sluice 14. The inclined sieve 16 is constructed similarly to the partitions 9, being comprised of a flat plate or sheet with a matrix of openings disposed therein to permit passage of water while retaining solids on its surface. The upper surface is smooth to reduce the friction on solids sliding down its surface. The inclined sieve 16 is preferably rectangular in shape and inclined downward in the inboard direction orthogonally to the longitudinal axis of the sluice 14. Its upper edge is collinear with the upper edge of the outboard side of the sluice 14. The upper surface of the inclined sieve 16 is coplanar with the surface of the outboard side of the sluice 14, thereby presenting a continuous planar surface between the outboard half of the sluice 14 and the upper section of the inclined sieve 16.

As stated above, the width of the separator assembly 11 is preferably about slightly more than one-half the width of the lid 2. With this dimension, the lower edge of the inclined sieve 16 extends sufficiently beyond the longitudinal partition 9 between the first chamber 6 and the smaller sub-chambers 7, assuring that the dewatered solids fall solely into the first chamber 6. However, the lower courses of openings in the inclined sieve 16 overhand the first chamber 6, which would otherwise permit waste water to enter as well into the first chamber 6. To remedy this, a first slide 17 is provided below the inboard half of the inclined sieve 16, to direct separated water into the first several of the sub-chambers 7, 8. The first slide 17 is inclined downward slightly to the outboard side.

The inboard edge of the first slide 17 conjoins with the lower inboard edge of the inclined sieve 16, forming a seamless edge.

To prevent waste water falling from the first slide 17, or from the upper parts of the inclined sieve 16, directly into the interstitial space between the multi-chambered liner 5 and the interior wall of the tank 1, a second slide 18 is provided. This second slide 18 extends from the outboard edge of the opening in the tank lid 3 and extends inboard and downward into the volume of the tank 1 below the inclined sieve 16. The lower, inboard edge of the second slide 18 is disposed approximately medially above the sub-chambers 7, 8.

Figure 6:
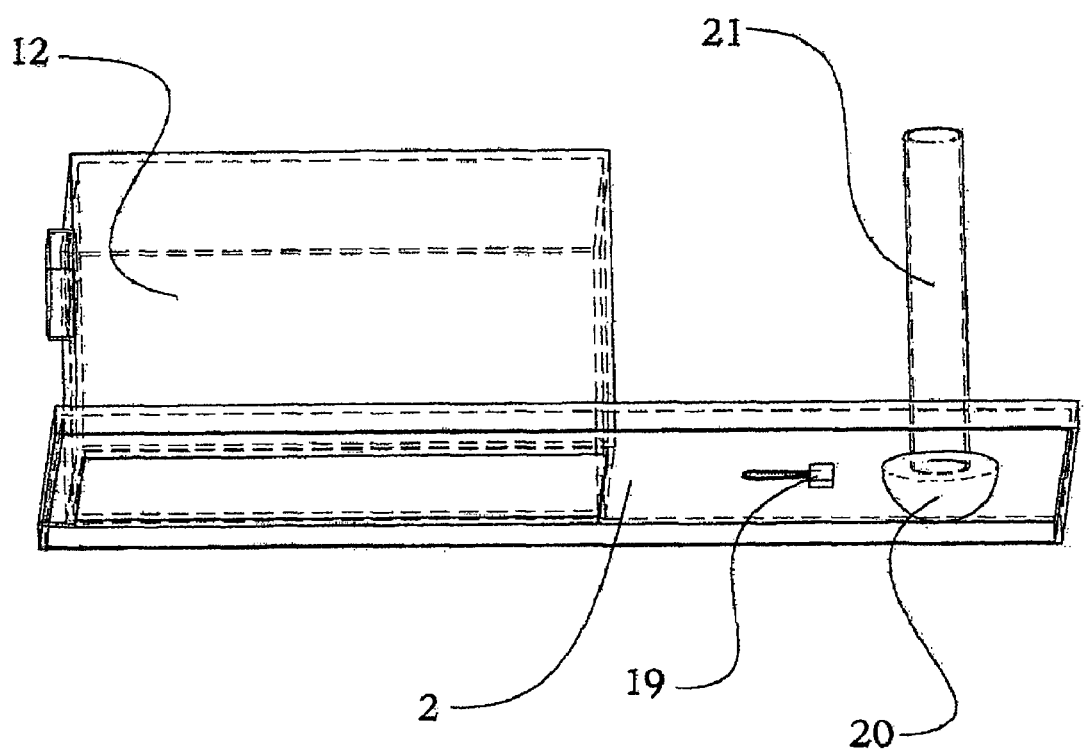
FIG. 6 is a perspective view of the underside of the lid, illustrating several accessories to the apparatus.

As shown in FIG. 6, several additional accessories may be included in the bio-composting domestic waste treatment apparatus. These include an electric heater 19 and a calcium chloride addition system.

The electric heater 19 assists in maintaining an adequate temperature for the bio-composting fauna and flora during the winter months in colder environments. As described below, the bio-composting domestic waste treatment apparatus is installed into the ground about to the level of the lid 2 of the tank 1. Heat may dissipate through the lid 2 during colder temperatures, reducing the temperature within the bio-composting domestic waste treatment apparatus. The electric heater 19 provides sufficient additional heat to compensate for the heat dissipated through the lid 2.

The calcium chloride addition system provides a permeable basket 20 inside the volume of the tank 1 containing calcium chloride tablets. The calcium chloride tablets reduce offensive odors produced in the bio-composting domestic waste treatment apparatus and help in producing additional heat by the absorption of moisture in the vapor space of the interior of the tank 1. The tablets are inserted into the basket 20 through a vertical charge pipe 21 projecting through and above the lid 2.

The calcium chloride addition system is preferably comprised of a semispherical permeable basket 20 disposed on the lower surface of the tank lid 2. A hole or opening is disposed in the lid 2, medially above the permeable basket 20. A charge pipe 21 is provided, the lower end of which registers with the opening and extends to a height above the lid 2 sufficient for comfortable charging of CaCl tablets through its upper end. A cap is provided on the upper end of the charge pipe 21 to prevent entry of precipitation or undesirable fauna when not in use.

Figure 4:
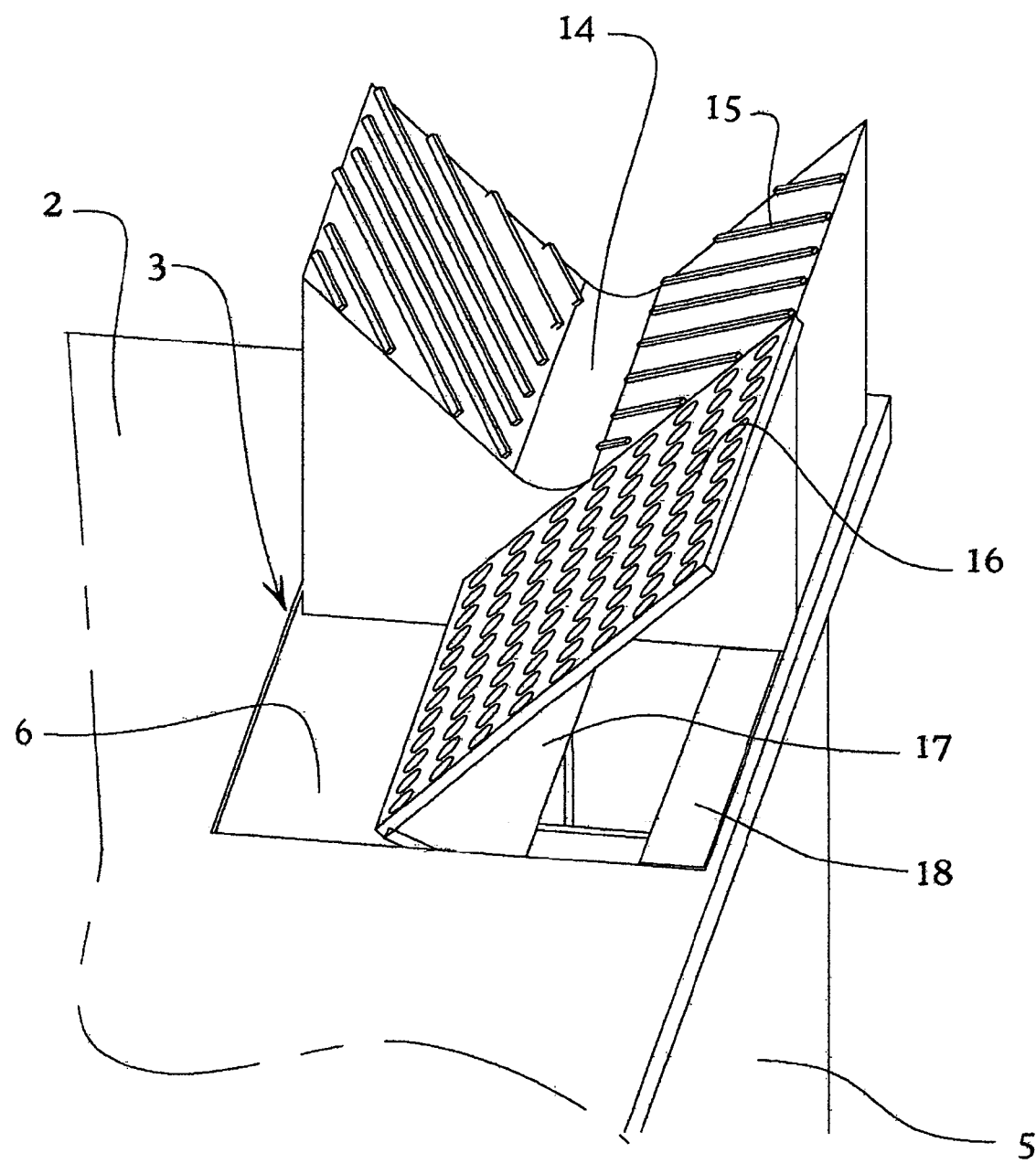
FIG. 4 is a second perspective view drawing of the separator assembly.
Figure 5:
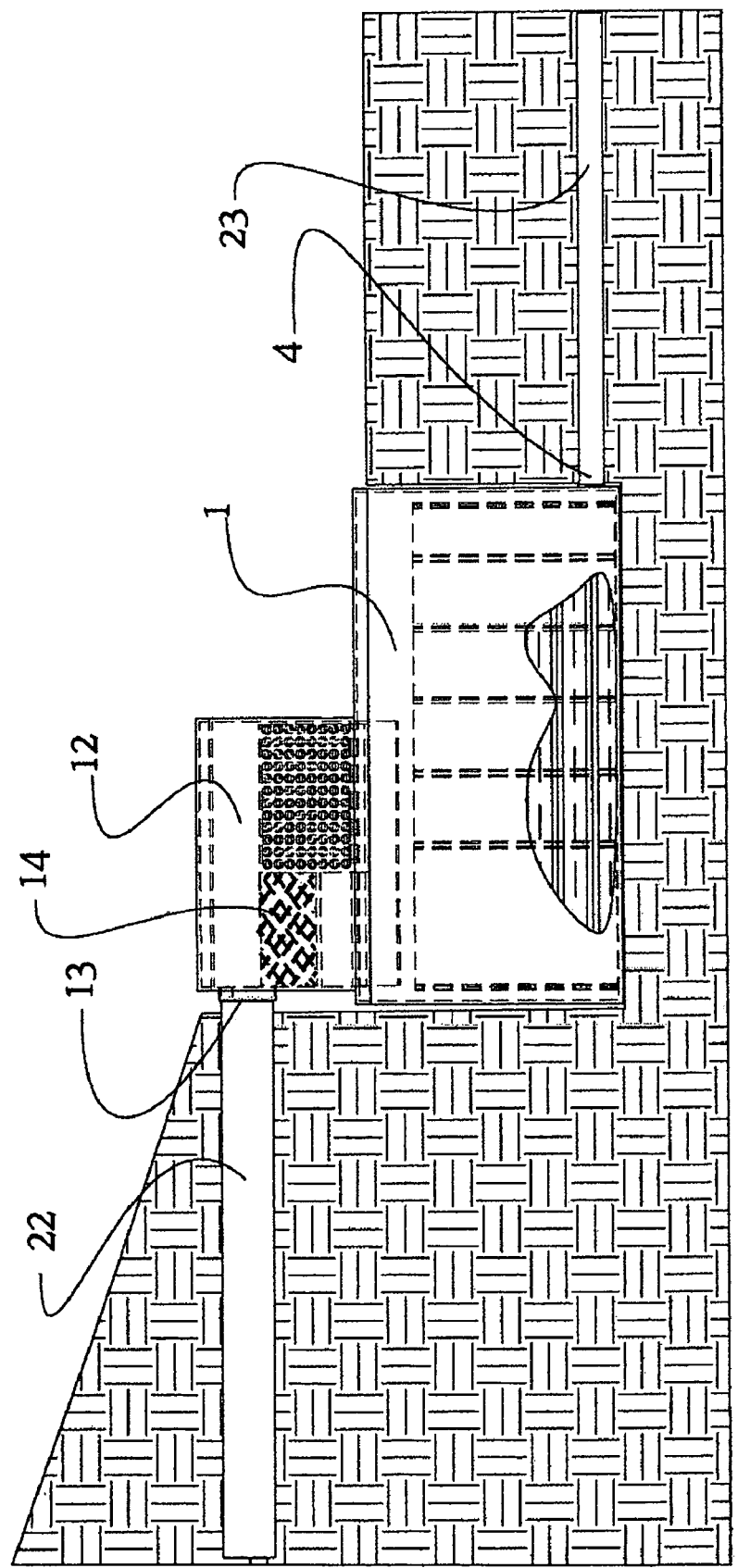
FIG. 5 is an elevational view of the apparatus installed in the earth.

The bio-composting domestic waste treatment apparatus is placed in service, as shown in FIG. 5, by excavating a pit in the ground to the dimensions of the tank 1. The tank 1 is lowered into the pit, with the upper surface of the lid 2 approximately flush with the surrounding ground level. The end of a waste drain line 22 carrying domestic waste from a residential dwelling is registered with the inlet 13 of the separator. An outlet pipe 23 is connected to the outlet 4 of the tank 1, and is routed to a suitable means of final disposal, such as a leach field or discharge to surface waters, as permitted by applicable environmental codes and regulations. A few tablets of calcium chloride are charged to the upper end of the charge pipe 21. Waste from the residential dwelling is first introduced into the separator, which flows across the sluice 14. As best illustrated in FIGS. 3 and 4, the ribs 15 on the surface of the sluice 14 divert the incoming waste stream up the outboard side of the sluice 14 in an arching trajectory, and then runs downward across the upper surface of the inclined sieve 16. The momentum provided by the ribs 15 assist in pushing the dewatered solids down the surface of the inclined sieve 16, which drop off the lower, inboard edge into the first chamber 6 of the multi-chambered liner 5. The waste water separated by the inclined sieve 16 drops through its openings, impinging upon the first or second or both slides 17, 18, and then into one of the first three sub-chambers 7. Due to the size of the openings in the inclined sieve 16, the separated waste water may still contain amounts of small entrained solids. These solids are removed by the partitions 9 as the waste water proceeds through the other sub-chambers 7, 8. The waste water permeates through the multi-chambered liner 5 walls surrounding the smaller chambers 7, 8 and into the interstitial space between the interior of the sidewall 10 of the tank 1 and the exterior of the multi-chambered liner 5. The waste water then flows to the outlet 4 and to final disposal.

The dewatered solid waste slides off the lower edge of the inclined sieve 16 into the first chamber 6. Any residue free water in the waste solids can drain through the permeable surrounding walls into one of the sub-chambers 7, 8 or into the interstitial space between the multi-chambered liner 5 and the interior of the tank side wall 10. Within the first chamber 6, the waste solids accumulate and are decomposed by micro and minuscule organisms, such as fungus gnat larva. Field trials have shown that a population of fungus gnat larvae can digest and remove domestic waste solids faster than its generation rate in a typical single family residence. When the bio-composting domestic waste treatment apparatus is first installed, an initial population of fungus gnat flies must be introduced into the system. This may be easily accomplished by leaving the lid 2 of the tank 1 open for several days after startup, or by introducing a starting culture of larvae. In some instances, fungus gnats have found their way into the apparatus through available cracks and gaps in mating surfaces without other assistance. Despite the low odor produced by the system, adult gnats had little difficulty finding their way to the composting waste. There they begin a continual lifecycle. Eggs are laid by adults in the waste solids, which hatch into larvae. The larvae ingest and consume the waste solids. When the larvae have sufficiently grown, they pupate, from which they later emerge as adults. The adults generally remain within the bio-composting domestic waste treatment apparatus when organic waste solids and light are present and lay the next generation of eggs, repeating the lifecycle. After egg-laying, adult gnats die and decompose in the waste solids. Eventually, the waste solids are reduced by the fungus gnat larvae into a thin, non-pathogenetic layer at the bottom of the first chamber 6. Any accumulated solids in the first chamber 6 can be removed by removing the lid 2 and then removing the solids.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

What is claimed is:

1. A bio-composting domestic waste treatment apparatus for treating residential domestic waste, comprised of:

an enclosed tank having an interior volume and an end wall with an outlet disposed therein;

a liner disposed within the interior of said tank, said liner having vertical walls and divided into a plurality of chambers separated by partitions; a removable lid; and a separator disposed on the lid, the separator comprised of a separator housing, an inlet disposed in the separator housing, a sluice within the separator housing adjacent the inlet, an inclined permeable sieve within the separator housing adjacent to the sluice opposite from the inlet, and a first slide disposed under the inclined sieve; and the sluice comprised of a plurality of ribs disposed on its upper surface.

2. The bio-composting domestic waste treatment apparatus of claim 1, wherein the chambers are comprised of a first chamber extending the length of the liner on one lateral side of the liner, and a plurality of chambers smaller than the first chamber, arranged serially along the length of the other side of the liner.

3. The bio-composting domestic waste treatment apparatus of claim 1, wherein the walls and partitions in the liner are permeable.

4. The bio-composting domestic waste treatment apparatus of claim 1, further comprised of a heater disposed within the tank.

5. The bio-composting domestic waste treatment apparatus of claim 1, further comprising a tablet addition system, comprised of a permeable basket disposed on the interior surface of the top of the tank, a hole disposed in the top of the tank into the interior of the permeable basket, and a charge pipe with a lower end registering with the hole in the top of the tank.

6. The bio-composting domestic waste treatment apparatus of claim 1, wherein the first slide has an inboard edge linearly conjoining with an inboard edge of the inclined sieve.

7. The bio-composting domestic waste treatment apparatus of claim 1, wherein an edge of the inclined sieve adjacent to the sluice adjoins and is coplanar with an outboard surface of the sluice.

8. The bio-composting domestic waste treatment apparatus of claim 1, wherein the lid has an opening therein, the dimensions of which are congruent to the dimensions of the bottom surface of the separator housing, and wherein the separator registers with the opening in the lid.

9. The bio-composting domestic waste treatment apparatus of claim 8, further comprised of a second slide disposed within the perimeter of the opening in the lid, said second slide having an outboard edge conjoining with an outboard edge of the opening in the lid, and said second slide descending inwardly.

10. A bio-composting domestic waste treatment apparatus for treating residential domestic waste, comprised of:
an enclosed tank having an interior volume and an end wall with an outlet disposed therein;
a liner disposed within the interior of said tank, said liner having vertical walls and divided into a plurality of chambers separated by partitions; a removeable lid; and
a separator disposed on the lid, the separator comprised of a separator housing, an inlet disposed in the separator housing, a sluice within the separator housing adjacent the inlet, an inclined permeable sieve within the separator housing adjacent to the sluice opposite from the inlet, and a first slide disposed under the inclined sieve; and
the first slide having an inboard edge linearly conjoining with an inboard edge of the inclined sieve.

11. The bio-composting domestic waste treatment apparatus of claim 10, wherein the chambers are comprised of a first chamber extending the length of the liner on one lateral side of the liner, and a plurality of chambers smaller than the first chamber, arranged serially along the length of the other side of the liner.

12. The bio-composting domestic waste treatment apparatus of claim 10, wherein the walls and partitions in the liner are permeable.

13. The bio-composting domestic waste treatment apparatus of claim 10, wherein an edge of the inclined sieve adjacent to the sluice adjoins and is coplanar with an outboard surface of the sluice.

14. The bio-composting domestic waste treatment apparatus of claim 10, wherein the lid has an opening therein, the dimensions of which are congruent to the dimensions of the bottom surface of the separator housing, and wherein the separator registers with the opening in the lid.

15. The bio-composting domestic waste treatment apparatus of claim 14, further comprised of a second slide disposed within the perimeter of the opening in the lid, said second slide having an outboard edge conjoining with an outboard edge of the opening in the lid, and said second slide descending inwardly.

16. A bio-composting domestic waste treatment apparatus for treating residential domestic waste, comprised of:
an enclosed tank having an interior volume and an end wall with an outlet disposed therein;
a liner disposed within the interior of said tank, said liner having vertical walls and divided into a plurality of chambers separated by partitions; a removeable lid; and
a separator disposed on the lid, the separator comprised of a separator housing, an inlet disposed in the separator housing, a sluice within the separator housing adjacent the inlet, an inclined permeable sieve within the separator housing adjacent to the sluice opposite from the inlet, and a first slide disposed under the inclined sieve; and
an edge of the inclined sieve adjacent to the sluice adjoins and is coplanar with an outboard surface of the sluice.

17. The bio-composting domestic waste treatment apparatus of claim 16, wherein the chambers are comprised of a first chamber extending the length of the liner on one lateral side of the liner, and a plurality of chambers smaller than the first chamber, arranged serially along the length of the other side of the liner.

18. The bio-composting domestic waste treatment apparatus of claim 16, wherein the walls and partitions in the liner are permeable.

19. The bio-composting domestic waste treatment apparatus of claim 16, wherein the lid has an opening therein, the dimensions of which are congruent to the dimensions of the bottom surface of the separator housing, and wherein the separator registers with the opening in the lid.

20. The bio-composting domestic waste treatment apparatus of claim 19, further comprised of a second slide disposed within the perimeter of the opening in the lid, said second slide having an outboard edge conjoining with an outboard edge of the opening in the lid, and said second slide descending inwardly.

21. A bio-composting domestic waste treatment apparatus for treating residential domestic waste, comprised of:
an enclosed tank having an interior volume and an end wall with an outlet disposed therein;
a liner disposed within the interior of said tank, said liner having vertical walls and divided into a plurality of chambers separated by partitions; a removeable lid; and
a separator disposed on the lid, the separator comprised of a separator housing, an inlet disposed in the separator housing, a sluice within the separator housing adjacent the inlet, an inclined permeable sieve within the separator housing adjacent to the sluice opposite from the inlet, and a first slide disposed under the inclined sieve; and the lid has an opening therein, the dimensions of which are congruent to the dimensions of the bottom surface of the separator housing, and wherein the separator registers with the opening in the lid.

22. The bio-composting domestic waste treatment apparatus of claim 21, further comprised of a second slide disposed within the perimeter of the opening in the lid, said second slide having an outboard edge conjoining with an outboard edge of the opening in the lid, and said second slide descending inwardly.

* * * * *